July 23, 1963 H. F. JURGELEIT 3,098,695
PROCESS OF BALING PARTICULATE MATERIAL
Filed Sept. 16, 1960 7 Sheets-Sheet 1

INVENTOR.
HERBERT F. JURGELEIT
BY
Robert J. Patterson
ATTORNEY

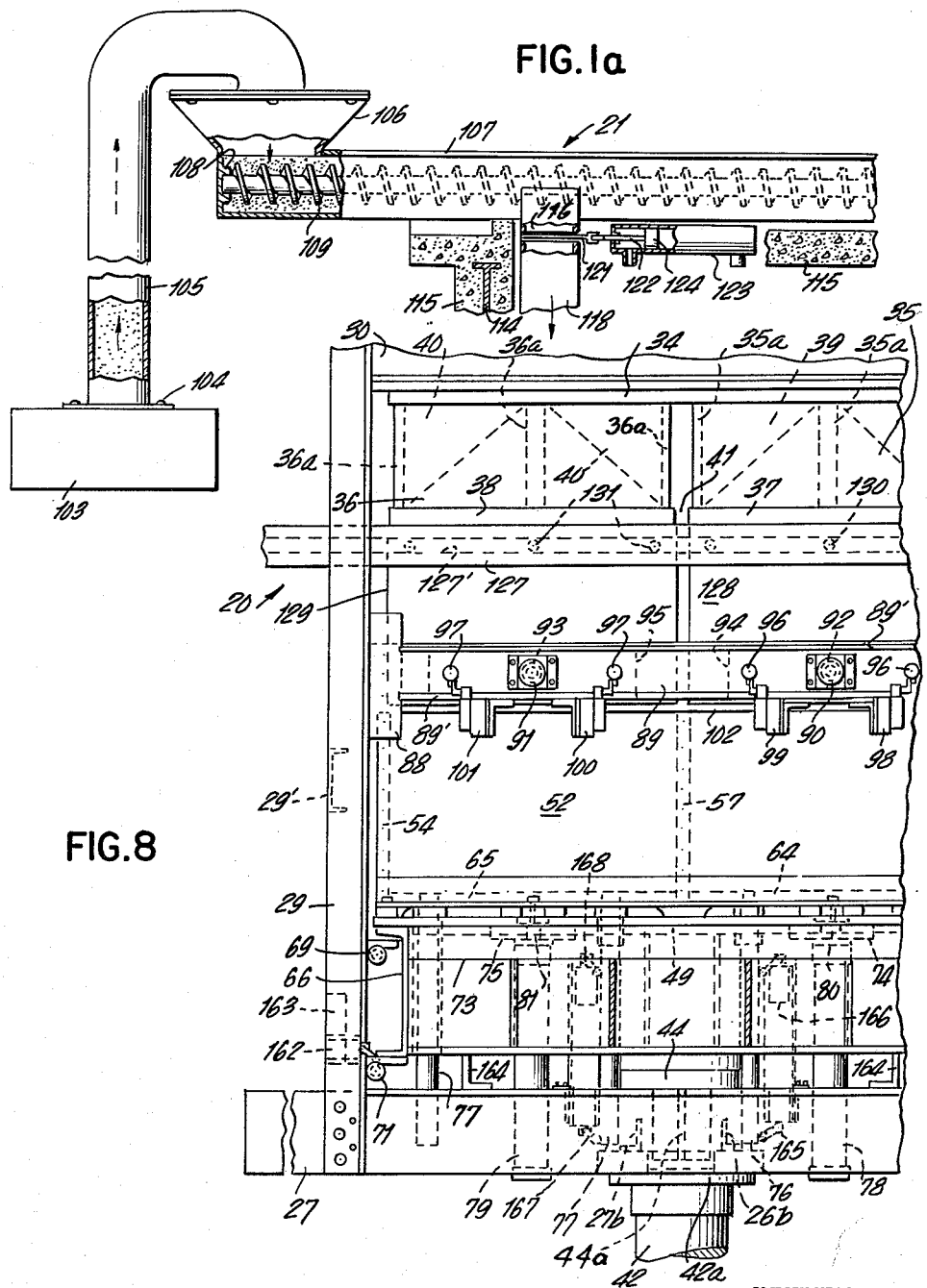

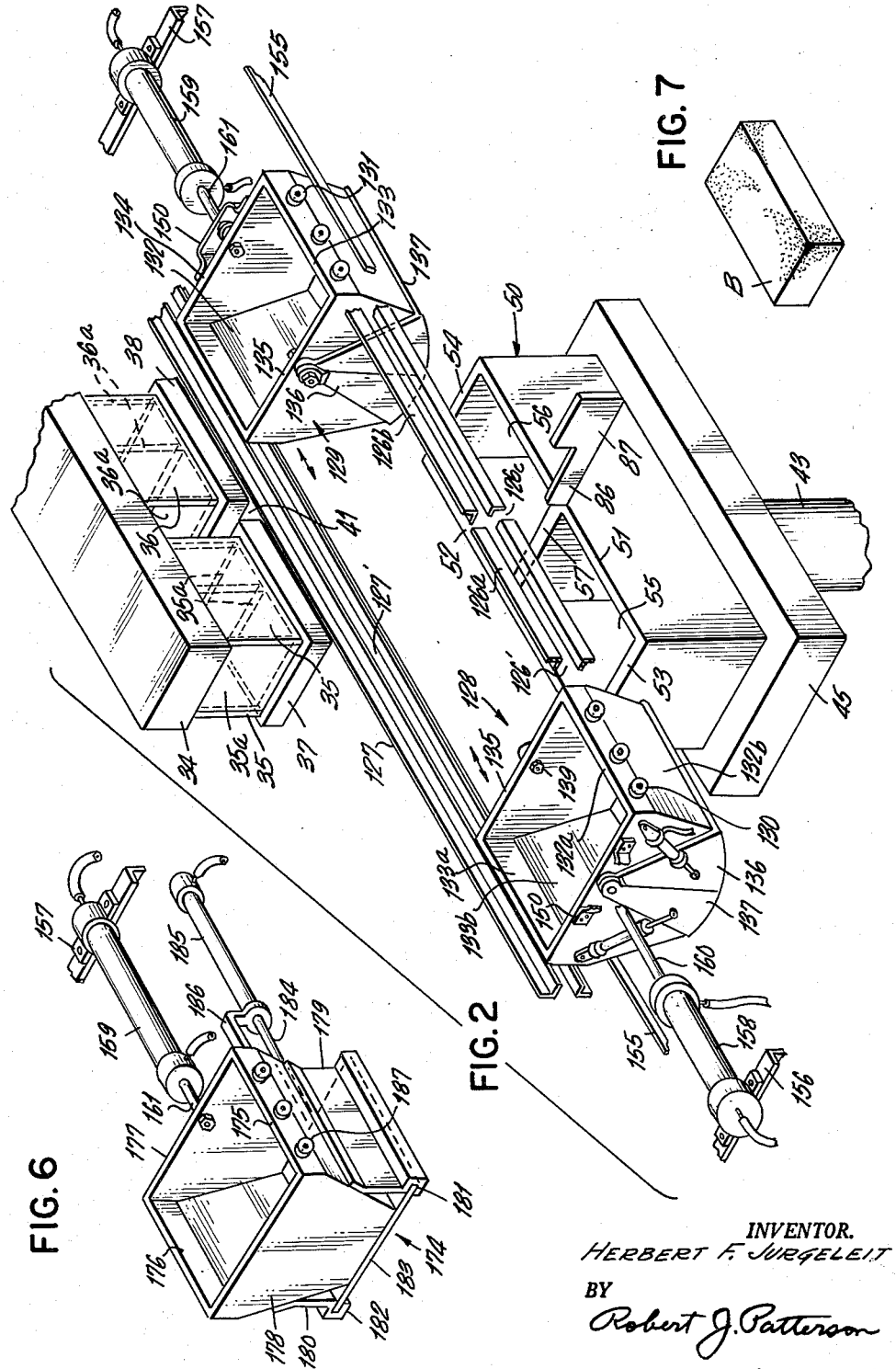

July 23, 1963  H. F. JURGELEIT  3,098,695
PROCESS OF BALING PARTICULATE MATERIAL
Filed Sept. 16, 1960  7 Sheets-Sheet 4
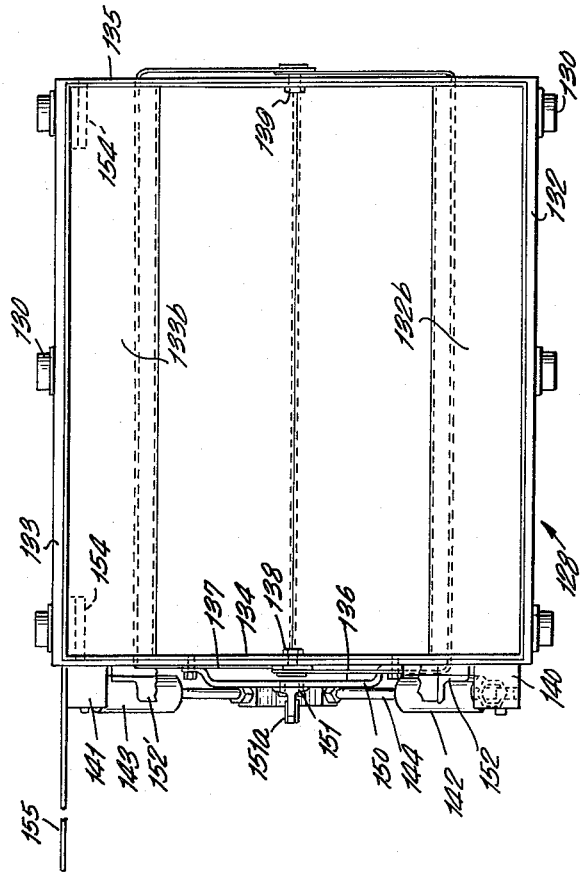
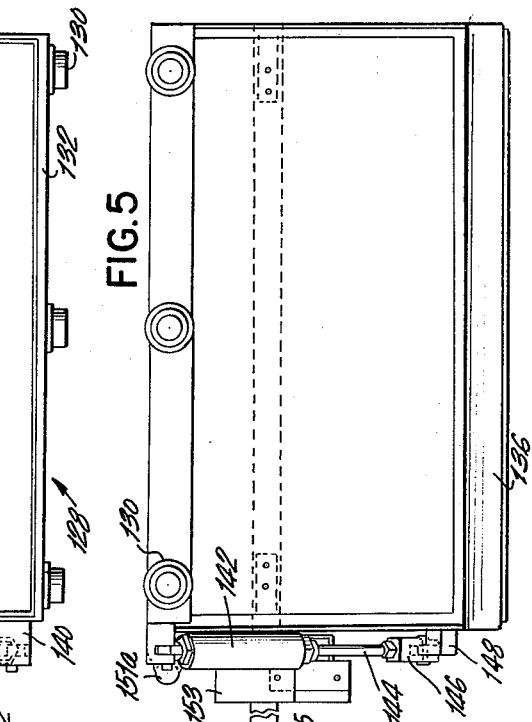
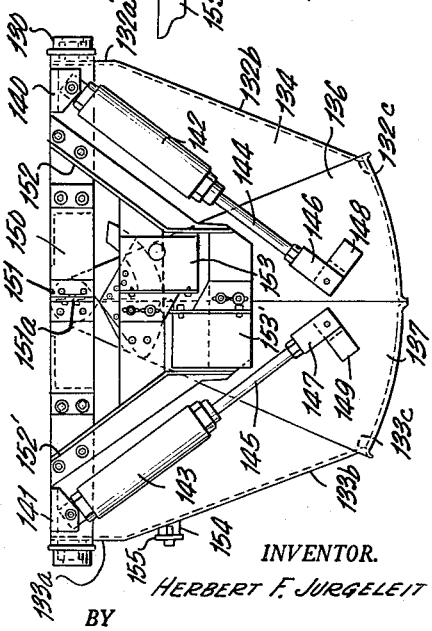
INVENTOR.
HERBERT F. JURGELEIT
BY
Robert J. Patterson
ATTORNEY INVENTOR.
HERBERT F. JURGELEIT
BY
Robert J. Patterson
ATTORNEY

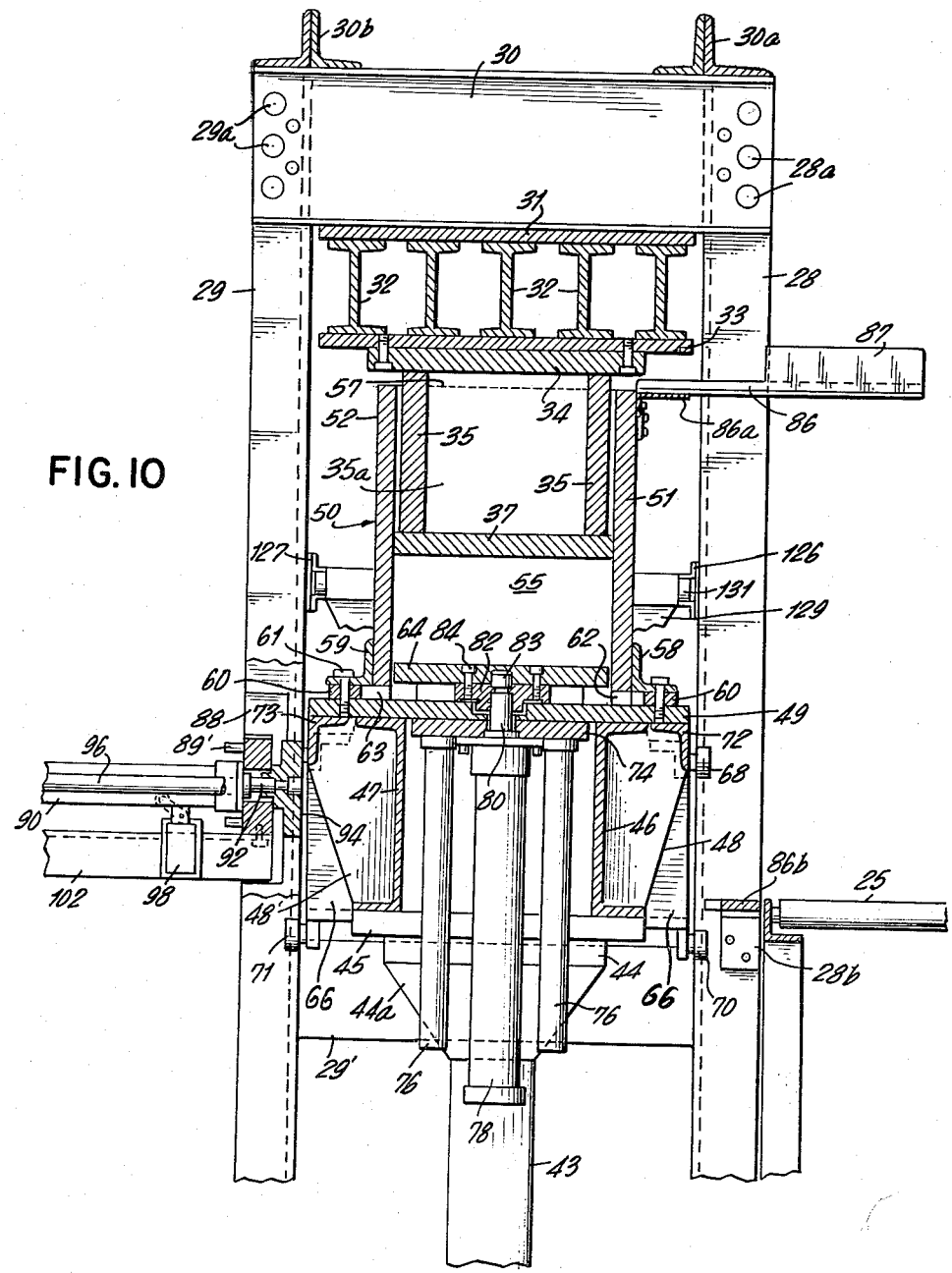

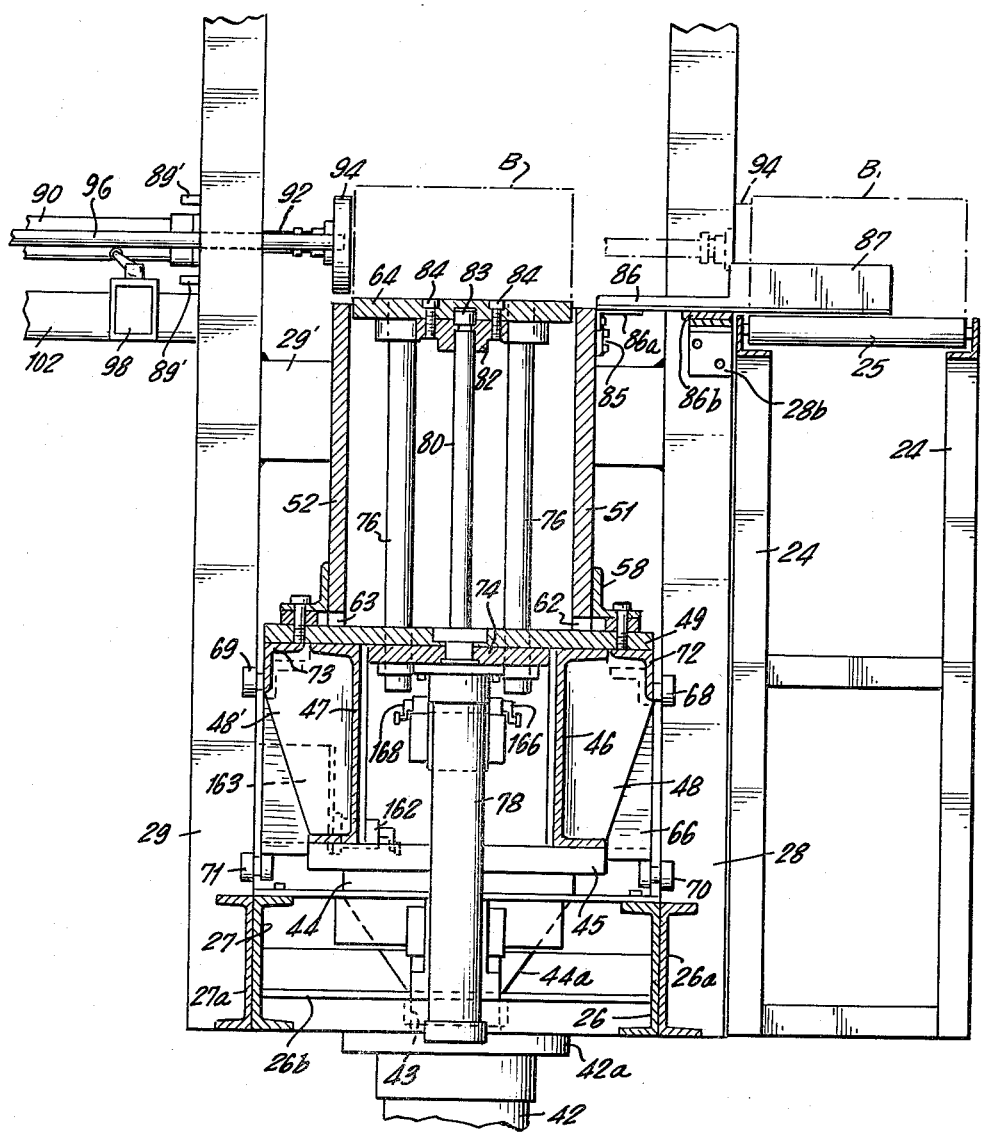

United States Patent Office 3,098,695
Patented July 23, 1963

3,098,695
PROCESS OF BALING PARTICULATE MATERIAL
Herbert F. Jurgeleit, Oceanside, N.Y., assignor to United States Rubber Company, New York, N.Y., a corporation of New Jersey
Filed Sept. 16, 1960, Ser. No. 56,483
2 Claims. (Cl. 18—48)

This invention relates to processes of baling particulate materials, and in particular to a process of producing molded slabs or bales of a standard weight and precisely predetermined dimensions from crumbs or like particles of crude natural or synthetic plastic elastic polymers, irrespective of the specific gravity thereof, which are tacky and have the property of post-compression recovery or expansion.

The instant application is a continuation-in-part of my prior application Serial No. 809,130, filed April 27, 1959, and now abandoned.

Crude and tacky natural or synthetic polymers, such as rubber or the like, are usually shipped in bulk and uncured by the producers thereof to the consumers. In certain instances, it is preferred for reasons of economy and uniformity to ship these polymer materials in the form of rectangularly prismatic blocks or bales 7" x 14" x 28" in size and weighing exactly 72 pounds. One method of forming such bales which has been employed in the past entails a processing of the crude polymers, which are generally in the form of small chunks or dried crumbs, by milling the latter into a solid mass which is then sheeted out into continuous strips 14" wide and approximately 1" thick on two separate mills. The strips of polymer material are then conveyed to two weighing scales and there are folded manually or mechanically back and forth into piles 14" wide and 28" long until each pile has the required weight, at which time excess strip material is manually cut off. The uncompressed piles are thereafter transferred to a hydraulic press where they are compressed between plain, flat-surfaced press platens into the final bale form.

From the foregoing it will be understood that this known baling method requires an operator at each of the mills, an operator at each of the weighing scales and another operator at the press for removing the finished bales therefrom, a total of five operators. When it is considered that at most a single operator should be able to supervise a fully automatic baling operation, then it will be readily appreciated that the entire above procedure is highly inefficient and uneconomical. Moreover, the bales produced are dimensionally inferior and unsuitable for packaging in general and for storing purposes in particular, as will become clear from the following.

One of the major problems which every producer and shipper of such bales of crude polymers having the property of post-compression recovery faces is to insure that each bale must not only have a certain weight, but must also have, to the greatest degree of accuracy possible, the shape of a rectangular prism of precise dimensions and plane surfaces. This is highly essential since it is extremely desirable, from an economy viewpoint, that both during shipping and storage such bales take up a minimum amount of space and lend themselves readily to being arranged in stable stacks. Another reason for the need of producing bales of precise dimensions and plane surfaces arises from the problem of automatic mechanized packaging of such bales. Major producers of these bales desire to employ automatic devices for taking each bale as it comes from the press and inserting it into a bag made of any suitable packaging material. It is, consequently, evident that the mass of crude polymer material must be evenly or uniformly distributed over the active area of the baling press platen system due to the fact that after the bale-forming pressure is released, all parts of the compressed material must expand equally. In particular, this mass must have a substantially plane top surface prior to the application of the bale-forming compressive forces. If this were not so, i.e. if the mass of polymer material at one location of contact of the plunger were greater than that at another location, the finished bale would be uneven in shape (possibly formed with ridges, bulges, slanted faces, etc.) and would not lend itself readily to mechanized packaging in bags, nor to stacking with other bales without leading to a waste of space and a considerable instability of the stack.

As applied to the hereinbefore mentioned known process of forming such bales, it will be readily recognized, therefore, that the very manner in which the sheets are formed and then folded into bale shape brings about a non-uniformity in the material distribution and dimensional characteristics of the pile. This leads inevitably to an uneven post-compression expansion and shaping of the finished bales, making it extremely difficult to employ mechanized and automatic packaging techniques in connection therewith and thereafter to stack the packaged bales during storage or shipment thereof with a minimum waste of space.

It appears advisable to emphasize at this point that the attainment of an even material distribution where the raw material is a crude polymer which must not be cured, is rendered extremely difficult by virtue of the fact that the material is very tacky. This means that even if the material is in the form of crumbs as it travels to the press, as contemplated by the present invention, the crumbs will tend to coalesce and cohere, even when coated with anti-tack agents or powders such as zinc stearate, if left in a stationary position for more than a very short period of time. Moreover, with such a material in crumb form, ordinary leveling procedures at the press cannot be employed, since it is found that such devices as strike-off blades or vibrators, to name only two, are incapable of effecting the necessary reorientation of the crumbs of an uneven pile.

Thus it is clear that where, as in the present invention, the crude polymer material is being formed directly from crumbs into a rectangularly prismatic slab or bale and is elastic in nature so as to undergo an expansion or "recovery" after the shaping or forming pressure is relieved, steps must be taken, without recourse to standard leveling procedures, to ensure that the required uniform distribution of the crumbs in the press, and in particular the arrangement thereof in a mass having a substantially plane top surface, is effected in advance of the arrival of the crumbs at the press by the means employed for transferring the mass of polymer crumbs to be baled from the weighing scale mechanisms to the press. The only conventional structure which might be used for carrying out such a transfer with the object of obtaining an even distribution of a large quantity of pieces or particles, i.e. crumbs, of crude polymer materials is a reciprocating belt conveyor. Such a device is, however, extremely large and slow-acting as well as not completely reliable, and its use in general is beset by other considerable difficulties, since it requires adjustment of the conveyor to take into account and compensate for variations in specific gravity of the material, changes in crumb size, and the like. At the same time, the controls and other auxiliary equipment for such a conveyor are quite complex and expensive, and their presence, in conjunction with the necessarily time-consuming adjustments of the conveyor, would deprive the baling operation of any economic advantages.

It is, therefore, an important object of the present invention to provide a process of and means for baling particulate crude polymer materials in such a manner as to avoid the disadvantages and drawbacks inherent in heretofore known baling processes and apparatus.

Another object of the present invention is the provision of a high speed process of shaping crude, natural or synthetic plastic or elastomeric polymer materials in particulate form into brick or block-shaped bales of predetermined dimensions and weight, which process is characterized by a uniform distribution of the particles prior to the application of the bale-forming pressure.

Still another object of the present invention is the provision of a baling system particularly adapted for carrying out the aforesaid baling process and capable of ensuring attainment of a uniform distribution of the chunks or crumbs of the material to be baled during and as a function of the transfer of the crumbs from the weighing scale mechanisms to the baling press.

A further object of the present invention is the provision of a high speed baling system and process as aforesaid which admit of a drastic reduction in the required number of attendants and thus are both efficient and economical in construction and operation so as to considerably reduce the cost of the resultant products, i.e. the bales, to the consumer.

In particular, the present invention contemplates the provision of a novel baling process and system in which the milling, sheeting and cutting steps of the hereinbefore mentioned known baling process are eliminated, while the services of the corresponding attendants, which have always been required to supervise the various stages of the entire operation, are dispensed with, leaving it necessary only to provide one attendant for general and overall supervisory purposes. The present invention further contemplates the provision of such a baling process and system in which the possibility of an uneven amassing of the crumbs of polymer material in the baling press is substantially eliminated, while concurrently the formation of precisely rectangularly prismatic bales, the weight and dimensions of which are independent of the specific gravity of the polymer material and which are highly suited for automatic mechanized packaging in bags and for arrangement in stable stacks during storage and/or shipment, is assured.

More specifically, it is contemplated, in accordance with the present invention, in an automatic and high speed sequence of operations to weigh out the required quantity of the polymer material in crumb or particle form and then to transfer the weighed out mass, while the crumbs or particles are in a non-coherent state, to the press in such a manner that the crumbs become evenly distributed during and as a function of the transfer and may be deposited in the press forming cavity structure without any substantial disturbance of this even distribution.

Additionally it is contemplated, in accordance with the present invention, to produce two bales during each operational cycle and to provide means operable in association with the press cavity structure during each such cycle to ensure feeding of each pair of finished bales ejected from the press to the mechanized packaging equipment with a predetermined spacing or time lag between the said finished bales.

The foregoing and other objects, characteristics and advantages of the present invention will become more fully clear from the following detailed description thereof when read in conjunction with the accompanying drawings, in which:

FIG. 1a is an enlarged, fragmentary view of the means employed for feeding the material to be baled to the weighing mechanisms of the system shown in FIG. 1, certain parts being broken away to show constructional details;

FIG. 2 is a perspective, fragmentary and generally schematic view of the baling press together with a pair of reciprocally movable buckets which are parts of the means for transferring the crumbs to the press forming cavities;

FIG. 3 is a top plan view of one type of transfer bucket employed in the system according to the present invention;

FIG. 4 is an end elevational view of the bucket shown in FIG. 3;

FIG. 5 is a side elevational view of the bucket shown in FIG. 3;

FIG. 6 is a diagrammatic perspective illustration of a modified type of transfer bucket adapted to be employed in the system according to the present invention;

FIG. 7 is an isometric view of a bale of crude polymer material as produced in accordance with the present invention;

FIG. 8 is a fragmentary rear elevational view, on an enlarged scale, of the baling press shown in FIG. 1 and illustrates the same with the transfer buckets in their dumping positions;

Figure 9:
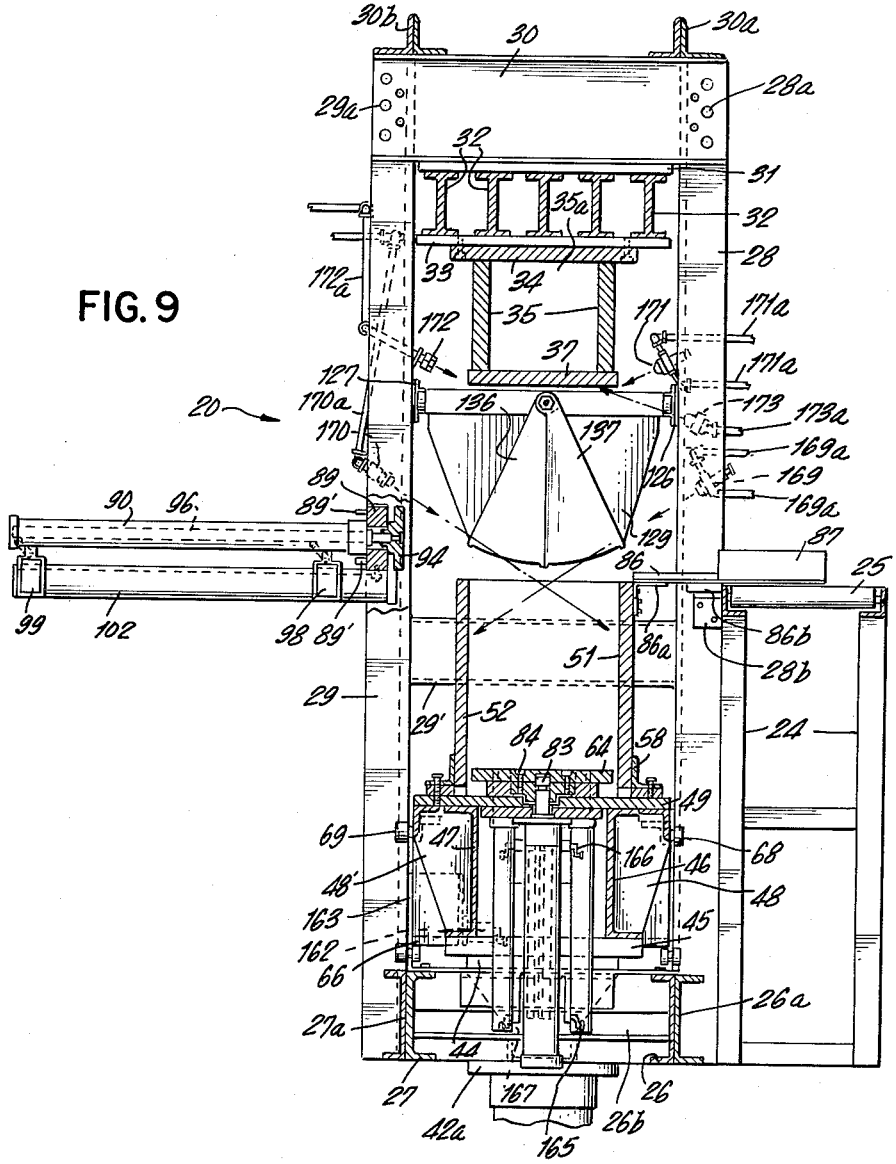
FIG. 9 is a side elevational view, partly in section, of the baling press shown in FIG. 8 and illustrates certain auxiliary details thereof.

FIG. 10 is a fragmentary view similar to FIG. 9, also shown partly in section to illustrate the positions of some of the elements of the press during the crumb-compression stage of its operational cycle; and FIG. 11 is a fragmentary view similar to FIG. 10 and also partly in section to illustrate the positions of some of the elements of the press during the ejection of a formed bale from the press cavity.

The process of baling, without curing, crude tacky polymer materials having the property of post-compression recovery, in accordance with the basic aspect of the present invention, comprises a series of automatically effected and sequential steps which are carried out at relatively high speed. As the first step of the process, the crude polymer material, in crumb or like particle form, is weighed out into two batches of 72 pounds each, the weighing operation being very rapid so as to prevent any coalescence of the crumbs. The weighed out batches of crumbs are then transferred, while in the non-coherent state thereof, to a pair of forming stations, to wit the compression cavities of the baling press. This transfer is carried out in such a manner that the masses of crumbs become evenly distributed, and in particular have substantially plane top surfaces, upon their arrival at the said cavities. Thereafter, the masses of crumbs are subjected for a predetermined interval to a pressure of predetermined magnitude to form the desired bales, which upon expansion subsequent to the release of the compression force have precisely predetermined dimensions without any irregularities in their brick-like shapes.

In essence, the aforesaid transfer of the crumbs from the weighing stations to the forming stations is a two-stage operation necessitated by the general physical arrangement of the baling system employed to carry out the process. In the first stage of the transfer operation, the batches of crumbs are released from the scales or weighing mechanisms so as to fall downwardly therefrom for a predetermined distance along a pair of paths of free fall which in the main are substantially vertical. At the bottom ends of these paths the batches of crumbs enter a pair of transfer buckets the function of which is, in the second stage of the transfer operation, to bring the batches of crumbs to and dump them as loose and non-coherent but unitary masses into the cavities of the press. The buckets are specially designed for optimum dumping operation, as more fully explained hereinafter.

The paths of free fall are confined or enclosed, in accordance with the preferred aspect of the present invention, by a pair of chutes which not only guide the crumbs to their destinations, but also play a part in ensuring that the batches of crumbs pile up in the respective transfer buckets in the form of masses the top surfaces of which are substantially plane with perhaps a slight upwardly convex curvature at the central regions thereof. It is assumed that this is at least in part due to the fact that the crumbs entering the buckets rebound upwardly therefrom and reenter the lowermost end sections of the respective chutes where they collide with later arriving crumbs either directly or indirectly after rebounding from the walls of the chutes, whereby each batch of crumbs is agitated in a manner resembling Brownian movement and thus is rendered substantially uniform in distribution.

In addition to the foregoing, of course, it is essential for the practice of the baling process of the present invention that the so-formed uniform masses of crumbs be received in the cavities of the press without any substantial disturbance of their even distributions. This is accomplished by the previously referred to and still to be described special construction of the transfer buckets, which ensures that the said masses drop out of the buckets as substantially unitary bodies which undergo only a slight flattening out when hitting the bottoms of the press cavities to present horizontally flat top surfaces for contact by the press plungers.

Figure 1:
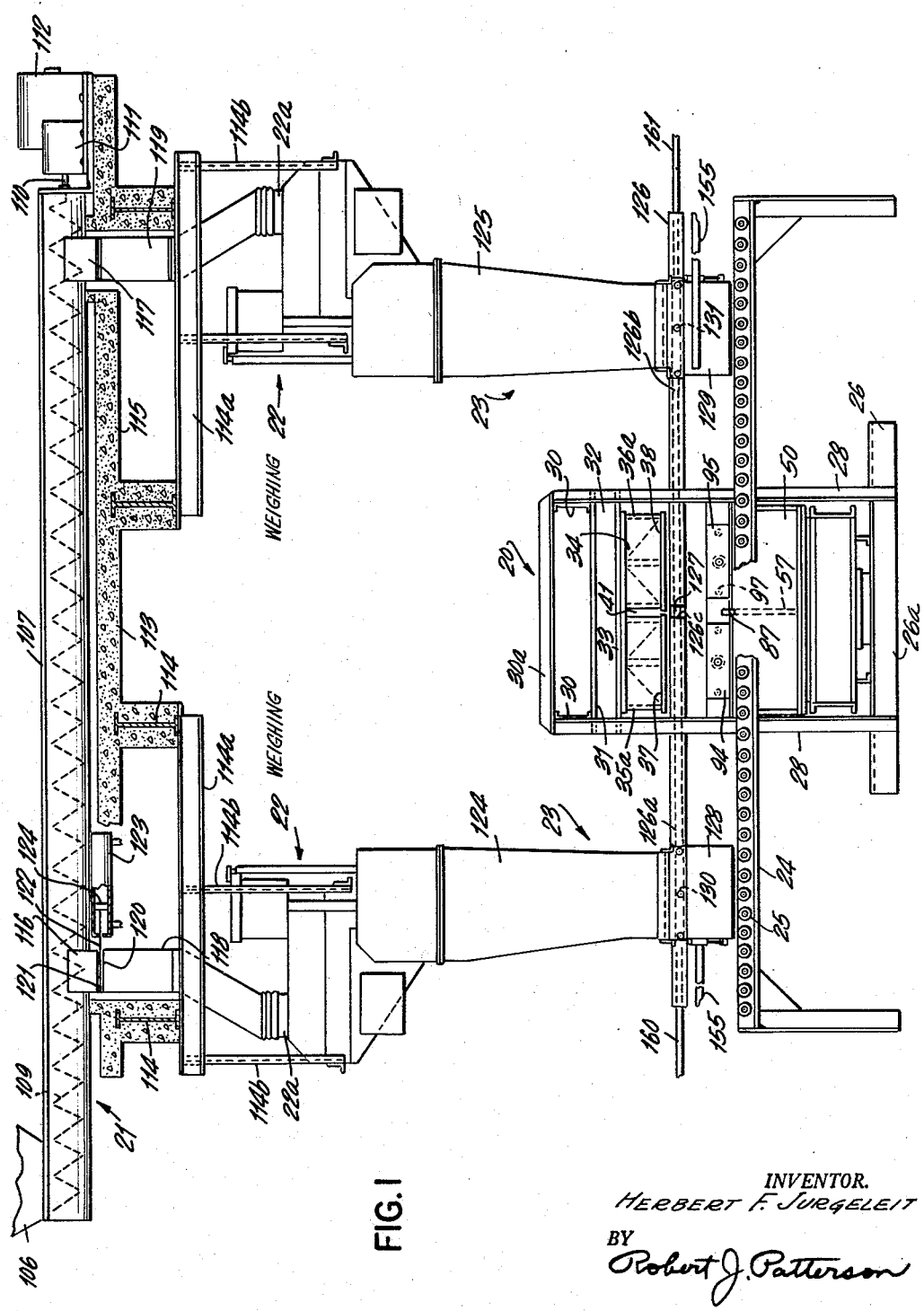
FIG. 1 is a partly schematic and diagrammatic front elevational view of a baling system according to the present invention and illustrates both the baling press and the means for transferring the material to be baled to the press.

Referring now to FIGS. 1 and 1a, it will be seen that the baling system according to the present invention comprises a baling press 20, a material feeding system 21 located above the baling press, a pair of automatic scale or weighing mechanisms 22 adapted to receive and weigh out batches of crumbs from the feeding system, and a pair of transfer arrangements 23 for transferring the weighed out batches of crumbs from the weighing mechanisms 22 to the forming cavities of the baling press 20. Positioned in front of the baling press is a conveyor table 24 provided with a plurality of positively driven rollers 25 by means of which bales B (see FIG. 7) formed in the baling press are transferred to mechanized packaging equipment (not shown) subsequent to ejection of the bales from the press.

As more clearly shown in FIGS. 8, 9 and 10, the baling press 20 comprises front and rear horizontal channel beams or girders 26 and 27 which are mounted on any suitable rigid supporting surface (not shown). Rigidly affixed to and extending vertically upwardly from the beams 26 and 27, respectively, at the opposite ends of the latter are front and rear standards 28 and 29. The upper ends of the two pairs of upright standards or frame members 28—29 at the sides of the press are connected by means of channel beams 30 which are preferably bolted to the standards, as shown at 28a and 29a (FIG. 10), while the two pairs of standards 28 and 29 at the front and rear of the press are connected by means of respective pairs of welded angle members 30a and 30b the horizontal flanges of which are welded to the top flanges of the channel members or beams 30. The press frame is further rigidified by a pair of front to rear channel members 29' welded at their opposite ends to intermediate sections of the respective pairs of standards 28—29, by two channel members 26a and 27a welded to the outer faces of the channel members 26 and 27 intermediate the respective pairs of standards 28 and 29, and by two angle members 26b and 27b (FIG. 8) each welded at one end to the inner face of the channel member 26 and at its other end to the inner face of the channel member 27.

Supported by the channel members 30 at the bottom thereof and extending across the gap therebetween from one side of the press frame to the other is a rigid plate member 31 to the lower surface of which are welded a number of I-beams 32. Welded to the bottom ends of the I-beams 32 is a plate member 33 to the lower surface of which is bolted a plate 34. The plate 34 carries two sets of vertical plate members 35, 35a and 36, 36a to the lowermost edges of which are bolted, respectively, platens 37 and 38. The respective platen mounting structures 34—35—35a and 34—36—36a may be suitably strengthened by the provision of reinforcing plates 39 and 40 (not shown in FIG. 2) each welded at one edge to the horizontal plate 34 and at another edge to a corresponding one of the plate members 35a and 36a. As clearly shown in FIGS. 1 and 8 (see also FIG. 2), the platens 37 and 38 are spaced from one another to provide therebetween a gap 41 the function of which will be more fully explained hereinafter.

The main hydraulic power cylinder 42 is located below the press frame 26—27—28—29 with its uppermost flange 42a located at the floor level of the surface on which the beams 26 and 27 are supported. The main ram 43 projects upwardly from the cylinder 42 and is provided with an enlarged head 44 which extends upwardly through the space between the reinforcing angle irons 26b and 27b and is rigidified by lateral ribs or plates 44a. Fixed to the top of the ram head 44 is a rigid ramcap 45 to the upper surface of which are welded two channel members 46 and 47 which are spaced from one another between the front and rear standards of the press frame and strengthened by reinforcing plates 48 and 48'.

Welded to and across the uppermost ends of the channel members 46 and 47 is a mounting plate 49 which thus is adapted for vertical reciprocal movement together with the ram 43. The mounting plate 49 carries on its upper surface an open-topped cavity structure or member 50 which consists essentially of a rectangular hollow body having front and rear walls 51 and 52 and side walls 53 and 54 defining a rectangular space which is divided into two rectangular cavities 55 and 56 by a central partition 57. The thickness of the partition 57 is slightly less than the width of the gap 41 between the plates 37 and 38. Affixed to the outer surfaces of the front and rear walls 51 and 52 of the cavity member 50 at the bottom thereof are two angle members 58 and 59 the horizontal webs of which rest on the mounting plate 49 through the intermediary of a plurality of spacer rings 60 through which extend bolts 61 by means of which the cavity structure 50 is rigidly connected to the mounting plate 49. Thus, there are provided spaces 62 and 63 between the bottoms of the cavity walls 51 and 52 and the top of the mounting plate 49 for a purpose to be more fully explained presently.

Positioned across the bottoms of the cavities 55 and 56, respectively, are two plates 64 and 65 which fit into the respective cavities with a slight clearance on all sides so as to be in effect slidably received therein. By means still to be described, these plates may be reciprocated vertically within their respective cavities, but in their normal positions they are disposed as shown in FIGS. 9 and 10 and constitute the bottoms of the cavities 55 and 56, thus defining the surfaces onto which the batches of crumbs to be compressed and baled are to be dumped.

Rigidly affixed to the underside of the mounting plate 49 and to the opposite ends of the channel members 46 and 47 are channel members 66 which carry a plurality of rollers 68 and 69 at their top ends and a set of rollers 70 and 71 at their bottom ends. The upper ends of the channel members 66 are further strengthened by a pair of angle members 72 and 73 welded at their opposite ends to the channel members 66. The various rollers are adapted to ride along a corresponding set of guide tracks (not shown) provided on the associated vertical press frame members or standards 28 and 29. In this manner the entire cavity structure 46—47—48—49—50—66 is arranged for true vertical reciprocal movement within the press frame.

At its underside, the mounting plate 49 carries auxiliary mounting plates 74 and 75. The plates 74 and 75 as well as the plate 49 are provided with holes (not shown) which slidably accommodate respective sets of guide rods 76 and 77 attached to the cavity bottom plates 64 and 65. Bolted to the plates 74 and 75, respectively, are hydraulic cylinders 78 and 79 which enclose reciprocally movable pistons (not shown) carrying upwardly projecting piston rods 80 and 81. As most clearly shown in FIGS. 10 and 11, the piston rods 80 and 81 project upwardly out of their respective cylinders 78 and 79 through apertures provided in the auxiliary mounting plates 74 and 75 and in the main mounting plate 49. Fitted over the top end of each of the piston rods 80 and 81 is a stepped and counterbored bushing 82 which is affixed to the respective piston rod by a screw or bolt 83 threaded axially into the free end of the same. The heads of the screws 83 are received in respective recesses formed in the undersides of the cavity bottom plates 64 and 65, and the latter are affixed to the bushings 82 by bolts 84. In this manner, the plates 64 and 65 are connected to the piston rods 80 and 81, respectively, and can be reciprocated within the associated cavities 55 and 56, upon corresponding actuation of the hydraulic motors 78 and 79, between the positions shown in FIGS. 10 and 11.

It will thus be apparent that the cavity member 50 can be raised by the main ram 43 toward the stationary plungers 37 and 38. As these enter the cavities 55 and 56, respectively, as shown in FIG. 10, the partition 57 enters and is located within the gap 41 between the plungers. Thus, there is no interference with the upward movement of the cavity member 50, and any crumbs of the polymer material previously dumped onto the plates 64 and 65 will be compressed between the latter and the stationary platens or plungers 37 and 38. It is to be noted that at such time, of course, the cavity bottom plates 64 and 65 remain at the bottoms of the cavities 55 and 56, since the hydraulic motors 78 and 79 remain inactive and move jointly with the main ram 43 and the cavity structure 49—50 carried by the ram. On the other hand, when the cavity structure moves toward its lowermost position, the bottom plates 64 and 65 can be raised to the extent shown in FIG. 11 so as to move the finished bales B to positions outside of the confines of the cavities 55 and 56 for removal from the press, as will be more clearly described presently.

Bolted to the front wall 51 of the cavity member 50 at the top edge thereof, as shown at 85, is a bracket or arm 86 which extends from the wall 51 frontwardly through the space between the vertical standards 28. The arm 86 carries at its outermost end an enlarged bar or plate member 87 which extends across a major portion of the width of the roller conveyor 24—25. Also bolted to the wall 51 is a narrow, horizontal plate or apron 86a which is located directly under the arm 86 and extends to either side thereof substantially coextensively with the cavities 55 and 56. The arm 86, apron 86a and plate 87 are thus movable with the cavity member 50 for a purpose to be more fully explained hereinafter. A similar plate or apron 86b is mounted on a frame cross member 28b extending between the standards 28 at a level just below the lowermost position of the arm 86. As clearly shown in FIGS. 1 and 2, the arm 86 and plate 87 are disposed in the same vertical plane as the cavity-forming partition 57 within the member 50.

Referring further to FIGS. 8, 9, 10 and 11, it will be seen that to the inwardly facing sides of the rear standards 29 there are welded, respectively, two mounting blocks 88 (only one is shown in FIG. 8). Bolted at its opposite ends to the blocks 88 and extending across the rear of the press frame is a mounting plate 89 reinforced by longitudinal ribs 89′ at its top and bottom edges. To the rearwardly facing side of the plate 89 are bolted a pair of pneumatic cylinders 90 and 91. Reciprocally arranged within the cylinders 90 and 91 are pistons (not shown) to the front faces of which are connected piston rods 92 and 93 which project out of the respective cylinders and have bolted to their free ends, respectively, pusher plates 94 and 95. The lower edges of the pusher plates 94 and 95 are disposed slightly above the top plane of the cavity member 50 (see FIG. 11). Affixed to the rear faces of the pusher plates 94 and 95 are, respectively, two pairs of guide rods 96 and 97 which extend slidably through correspondingly positioned apertures in the mounting plate 89. The rods 96 and 97 function to prevent any lateral tilting of the pusher plates 94 and 95 during the reciprocation thereof by the motors 90 and 91 and at the same time serve to actuate, respectively, a plurality of control switches 98, 99, 100 and 101 which are rigidly mounted on a bracket 102 affixed to and extending rearwardly from the mounting blocks 88, the switches 98 and 100 being located at that end of the bracket 102 adjacent the press frame standards 29, and the switches 99 and 101 being located at that end of the bracket 102 remote from the standards 29 (see FIG. 9).

Turning now to FIGS. 1 and 1a, it will be seen that the crude polymer material in crumb form is delivered by the feeding means 21 to the weighing scale mechanisms 22 from a suitable enclosure 103 which is indicated only schematically in FIG. 1a and preferably includes a device (not shown) for comminuting the crude polymer material into the form of crumbs, and a crumb-displacing device (not shown) such as a high-power air blower. Bolted to the enclosure 103 at the outlet opening thereof, as shown at 104, is one end of a feed pipe 105 into and through which the blower is adapted to force the crumbs from the enclosure 103 for movement in the direction of the arrows shown in FIG. 1a. It will be understood that during such movement there will be no chance of the crumbs of the tacky polymer material coalescing, due mainly to the agitating action of the high pressure air stream generated by the blower and serving as the crumb-feeding agent within the pipe 105.

The end of the feed pipe 105 remote from the enclosure 103 communicates with the upper end of a hopper 106 the lower end of which is seated on one end of an open-topped elongated horizontal trough or conduit 107 and communicates with the interior of the said conduit. Positioned within the conduit 107 and journaled in suitable bearings such as 108 at the opposite ends thereof is a rotary screw conveyor 109. An extension 110 of the axle of the screw conveyor 109 extends out of the conduit 107 at the end thereof remote from the hopper 106 and is connected to a reducing gear mechanism 111 which in turn is connected to and adapted to be driven by an electric motor 112. The horizontal conveyor conduit 107 is preferably supported on a rigid structure 113 above the baling press 20, for example a suitable combination of steel beams 114 and concrete 115.

The conveyor conduit 107 is further provided in its bottom and at two locations spaced longitudinally thereof with a pair of short outlet chutes 116 and 117 which communicate at their lowermost open ends with the uppermost ends of a pair of conduits 118 and 119 extending downwardly to and communicating with the inlet chutes 22a of the weighing scale mechanisms 22, respectively. The adjacent ends of the outlet chute 116 and the conduit 118 are spaced from one another to define a transverse gap 120 which is adapted to receive a sliding valve or gate member 121. The latter is connected to a piston rod 122 projecting from a double-acting pneumatic cylinder 123 rigidly mounted below the conveyor conduit 107. The piston rod 122 is connected in turn with a piston 124 reciprocally positioned within the cylinder 123. Depending on whether pressure fluid is admitted into the cylinder 123 from one end thereof or the other, the gate member 121 can be protracted into or retracted from the gap 120 so as to close or open the outlet passageway 116—118. The second conduit 119 is similarly spaced slightly from the chute 117, but is not provided, in the illustrated embodiment of the invention, with a gating structure such as that provided for the conduit 118. Thus, the outlet passageway 117—119 is always open. Nevertheless, it will be understood that a gating structure could also be provided for this passageway, if desired.

The conduits 118 and 119, as hereinbefore indicated, lead to and communicate with the automatic weighing scale mechanisms 22 which are indicated only schematically in FIG. 1 but are preferably rigidly supported from the beams 114 through the intermediary of horizontal beams 114a and vertical struts or frame members 114b. These mechanisms, which are also provided with automatic dumping or discharging means, are of a type available commercially. The interior construction of these mechanisms thus does not constitute a part of the present invention and accordingly is not explicitly illustrated and described herein. As will be more fully explained presently, however, the discharging or dumping actions of the scale mechanisms 22 are synchronized with the overall operation of the baling system as a whole through the intermediary of a suitable control circuit and switching arrangement (not shown).

The scale mechanisms 22 communicate at their discharging ends with the means 23 employed for transferring the weighed out batches of crumbs of the crude polymer material to the baling press. As clearly shown in FIG. 1, the transfer means 23 comprise a pair of substantially vertical chutes 124 and 125 of predetermined length which are open at their lowermost ends and terminate directly above the top edge plane of a pair of horizontal rails or tracks 126 and 127. These rails, the opposite end regions of which may be rigidly supported on any suitable structure (not shown) located exteriorly of the press 20, extend through the framework of the baling press at the front and rear thereof, the rail 126 being composed of two aligned sections 126a and 126b spaced from each other to provide a gap 126c and each rigidly affixed to a corresponding one of the front standards 28, and the rail 127 being rigidly affixed to the rear standards 29 (see also FIGS. 8, 9 and 10). The rails are provided with inwardly facing channels 126' and 127' which constitute the track ways for a pair of transfer buckets 128 and 129. The buckets 128 and 129, the construction of which will be more fully described presently, are provided with respective sets of rollers or wheels 130 and 131 at their front and rear sides (see also FIG. 2), which rollers are received in and ride along the track ways 126' and 127' of the rails 126 and 127 to permit the buckets to be moved, by means still to be described, from respective receiving positions underlying the transfer chutes 124 and 125 to respective discharging or dumping positions overlying the cavities 55 and 56 of the cavity member 50 within the confines of the baling press 20.

The buckets 128 and 129 are identical in construction, and thus, for the purpose of describing the details thereof, reference will be had only to the bucket 128. Turning now to FIGS. 3 to 5, it will be seen that the bucket 128 is substantially rectangular in horizontal cross-section and comprises front and rear side walls 132 and 133 and a pair of opposite end walls 134 and 135. The front and rear walls 132 and 133 are provided at their upper regions with vertical sections 132a and 133a and at their lower regions with slightly inwardly slanted sections 132b and 133b extending downwardly from the upper sections 132a and 133a, respectively, while the end walls 134 and 135 are planar throughout and are provided with side edges having vertical and tapered sections corresponding to the sections 132a—132b and 133a—133b of the front and rear walls 132 and 133. The rollers or wheels 130 are suitably journaled in the vertical sections 132a and 133a of the front and rear bucket walls 132 and 133. The gap between the lowermost edges 132c and 133c of the bucket walls 132 and 133 is adapted to be opened and closed by means of a pair of clam shell gates 136 and 137 which are pivotally supported at the upper edge regions of the bucket end walls 134 and 135 by means of a pair of pivot studs or bolts 138 and 139.

Also affixed to the uppermost edge region of the bucket end plate 134 are two brackets 140 and 141 to which are articulated, respectively, the double-acting cylinders 142 and 143 of a pair of quick-acting pneumatic motors. The piston rods 144 and 145 of these motors project slidably from the cylinders 142 and 143, respectively, and are articulated at their free ends by means of a pair of couplings 146 and 147 to a pair of stationary lugs 148 and 149 affixed to the end walls of the clam shell gates 136 and 137. It will thus be understood that retraction of the piston rods 144 and 145 into the cylinders 142 and 143 separates the gates 136 and 137, while protraction of the piston rods from their respective cylinders brings the gates into abutting relationship as shown in FIG. 4. The novel design of the bucket 128, both with respect to the inward pitch of the wall sections 132b and 133b and with respect to the curvatures and extent of angular movement of the gates 136 and 137, in conjunction with the provision of the quick-acting motors 142—144 and 143—145, is such that the bucket is uniquely qualified to perform its intended functions during each bale-forming operation, as will become clear presently.

An elongated U-shaped bracket 150 is affixed to the top edge region of the bucket end wall 134, the center section of this bracket being spaced from the end wall 134, as shown in FIG. 3, so as to clear the pivot location of the gates 136 and 137. Bolted to the bracket 150 substantially centrally thereof is a T member 151 the leg 151a of which extends away from the bucket wall 134 and is adapted to be connected to means for displacing the entire bucket along its path of movement. These means will be described presently. In addition, the bucket end wall 134 carries a pair of brackets 152 and 152' which are bolted at one end to the said end wall 134 and rigidly support at their other ends a pair of microswitches 153 and 153'. These switches are closed whenever the gates 136 and 137 are closed and, in conjunction with the remainder of the control circuit for the system, ensure that the bucket 128 cannot move unless the gates thereof are closed.

The bucket 128 is further provided at its rear wall 133 with a pair of brackets 154 which are attached to the exterior face of the slanted rear wall section 133b. Bolted to these brackets is a trip bar 155 which extends beyond the end wall 134 of the bucket and is adapted to contact a limit switch (not shown) when the bucket reaches the limit of its travel away from the press 20, i.e. when the bucket reaches the receiving position under the chute 124. The function of the trip bar will be more fully explained hereinafter.

Referring now in particular to FIG. 2 which, it must be remembered, is a primarily schematic and diagrammatic representation of the baling press and certain other aspects of the system according to the present invention, it will be seen that the bucket 129, which is in all respects identical to the bucket 128, is mounted on the tracks 126 and 127 in reverse relation to the bucket 128. Thus, the wall and gate member of the bucket 129 which correspond to the front wall 132 and gate member 136 of the bucket 128 face the rear of the baling press frame, while the wall and gate member of the bucket 129 corresponding to the rear wall 133 and gate member 137 of the bucket 128 face frontwardly of the press frame.

As clearly shown in FIG. 2, there are provided at spaced locations on opposite sides of the press frame and at the opposite ends of the tracks 126 and 127 two stationary mounting brackets 156 and 157. These may, for example, be parts of the same structures as are employed to support the outermost ends of the rails 126 and 127. Rigidly supported on these brackets, as by being bolted thereto, are, respectively, the double-acting cylinders 158 and 159 of a pair of high-speed pneumatic motors, from which cylinders project a pair of piston rods 160 and 161. The free ends of these piston rods are connected to the respective legs 151a of the T members 151 which are bolted to the brackets 150 carried by the end walls 134 of the transfer buckets 128 and 129. It will thus be understood that actuation of the said pneumatic motors by admission of pressure fluid into one or the other end of each of the cylinders 158 and 159 enables the buckets 128 and 129 to be displaced correspondingly in one direction or the other along the tracks 126 and 127, i.e. from the receiving stations to the discharge stations and back.

In view of the fact that it is contemplated to have the baling system according to the present invention operate cyclically and automatically, there are provided at various locations, in addition to those already mentioned herein, several control switches for the purpose of ensuring the proper sequential operation of the different parts of the entire system. Thus, there is provided a switch 162 which is mounted at the rear of the press frame by means of a bracket 163 and has its operating arm positioned for engagement by an adjunct of the ramcap 45 as the latter moves toward its lowermost position defined by a pair of stop members 164 welded to the top flanges of the base beams 26 and 27 (see FIG. 8). Likewise, there are provided two switches 165 and 166 adapted to be actuated by one of the guide rods 76 affixed to the cavity bottom plate 64, and two switches 167 and 168 adapted to be actuated by one of the guide rods 77 affixed to the other cavity bottom plate 65. For the sake of clarity, however, some of the switches are omitted in some figures of the accompanying drawings.

Referring to FIG. 9 in particular, it will be seen that the baling press 20 is further equipped with a system of spray nozzles consisting of two pairs of cooperating and oppositely downwardly directed nozzles 169 and 170 (only one of each is shown) mounted, respectively, at the front and rear of the press frame at a level slightly above the path of movement of the pusher plates 94 and 95, two pairs of cooperating and oppositely downwardly directed nozzles 171 and 172 (only one of each is shown) located exteriorly of the press frame, respectively, at the opposite sides of the latter and at a level just above the plane of the transfer bucket tracks 126 and 127, and a pair of upwardly directed nozzles 173 (only one is shown) mounted on the press frame at the front thereof intermediate the nozzles 169 and 171 and at a level just below the plane of the tracks 126 and 127. If desired, the nozzles 171 and 172 may be incorporated in the walls of the chutes 124 and 125 just above the receiving stations of the buckets 128 and 129. A system of pipes 169a, 170a, 171a, 172a and 173a, in which suitable control valves (not shown) are incorporated, connects the various pairs of nozzles to one or more sources of an adhesion-inhibiting or lubricating fluid such as silicone oil. As indicated by the various arrow-headed lines in FIG. 9, the nozzles 169 and 170 serve to spray the lubricant against the inner faces of the walls defining the cavities 55 and 56, the nozzles 171 and 172 to spray lubricant against the inner surfaces of the transfer buckets 128 and 129, and the nozzles 173 to spray lubricant against the lower faces of the plungers or platens 37 and 38. It will be clear to those skilled in the art that the various pairs of nozzles are actuated to spray lubricant at the proper times and in proper sequence during each complete cycle of operation of the baling system through the intermediary of the several control switches and other control circuitry provided for the system.

Although it is believed that the operation of the baling system, and thus the baling process, according to the present invention will be readily understood from the foregoing, it is nevertheless deemed advisable to set forth at this time one complete cycle of the operation of the system in order to clarify the various steps of the process.

It is assumed as a starting point that the system is just about to be set into operation, i.e. that no bales have as yet been produced. At this time, therefore, the main ram 43 of the press is in its lowermost position, whereby the cavity member 50 is in the position illustrated in FIGS. 1, 2, 8 and 9, while the bottom plates 64 and 65 within the respective bale shaping cavities 55 and 56 are also in their lowermost positions as illustrated in FIGS. 8 and 9. Concurrently, the buckets 128 and 129 are in their receiving positions below the transfer chutes 124 and 125, as illustrated in FIG. 1, while the gate member 121 is retracted from the passageway 116—118 rather than as shown in FIGS. 1 and 1a. The conveyor table 24 is set in operation, with the rollers 25 rotating counterclockwise as seen in FIG. 1.

The motor 112 is started to rotate the screw conveyor 109, and at the same time crumbs of the crude and tacky polymer material are blown from the enclosure 103 into the hopper 106, from where they drop into the conveyor conduit or trough 107 and begin to be moved along the latter by the screw conveyor 109. As the crumbs reach the outlet chute 116, they drop through the latter into the conduit 118 and thence into the associated weighing scale mechanism 22. The rate of feed of the crumbs through the conveyor conduit 107 is such that the required weight of the crumbs, to wit 72 pounds, is received in the respective weighing scale 22 within a relatively short period of time. As soon as the scale has received a sufficient quantity of the crumbs, it is automatically opened to discharge the weighed out batch of crumbs into the chute 124, while simultaneously through the intermediary of suitable control switches and circuitry (not shown) pressure fluid is admitted into the cylinder 123 so as to protract the gate member 121 across the passageway 116—118 and inhibit further admission of the polymer material into the weighing scale below the passageway 116—118.

At this point, therefore, the crumbs still in the conduit 107 are fed by the screw conveyor 109 toward the second outlet passageway 117—119. When the crumbs reach this passageway, they fall therethrough into the second weighing scale mechanism 22 until the latter has also received the required weight of the polymer material. As soon as this condition obtains, the second batch of crumbs is discharged into the chute 125 while through the intermediary of suitable control switches and circuitry the motor 112 is shut off to prevent further feeding of crumbs to the passageway 117—119. The arrangement is such that the motor is started up again and the gate member 121 retracted when all the weighed out crumbs have left the second scale, to permit the weighing for the second cycle to take place during the bale formation of the first cycle.

Reverting now to the first batch of crumbs, it will be recalled that these are discharge into the chute 124 while additional crumbs are being fed along the conveyor conduit 107 toward the passageway 117—119. The batch of crumbs falling freely through the chute 124 is still a loose, non-coherent mass of particles by virtue of the fact that the duration of the weighing period is so short that the crumbs cannot begin to coalesce. As the crumbs of this batch fall into the transfer bucket 128, some of them rebound into the chute 124 countercurrent to the still oncoming remainder of the batch. The rebounding crumbs, some of which may first have bounced off the side walls of the bucket or of the chute, thus collide with some of the following crumbs and, in effect, agitate the falling batch of crumbs in a manner very similar to the type of fluid agitation commonly referred to as Brownian movement. Accordingly, as the batch of crumbs settles in the bucket 128, it assembles there in a pile having a substantially uniform distribution and in particular in a pile having a top surface which is effectively flat or plane except for a relatively slight upwardly convex curvature in the central region of the pile. The chute 124 is thus seen to serve a multiple function; it defines the path of free fall of predetermined length for the crumbs while preventing loss of material due to the bouncing, and it ensures the attainment of the even distribution of the crumbs as a function of the manner of transfer thereof. Preferably, the chutes are about 6 to 12 feet long, but shorter or longer chutes may also be employed, the sole requirement being that the total distance of free fall must be long enough that the crumbs can bounce back sufficiently far along the path of fall to provide the prescribed agitation of the falling batch, as previously described.

It will be appreciated that the period of free fall of the crumbs through the chute 124 is very short, lasting perhaps for a fraction of a second or so, depending on the length of the chute. By the provision of suitable timing devices (not shown) in the control circuit of the baling system according to the present invention, it is possible to cause the admission of pressure fluid into the outermost end of the bucket-displacing cylinder 158 as soon as the entire batch of crumbs is received in the bucket 128. The latter is then shifted at a relatively high speed along the track 126—127 from its first terminal or receiving position to its second terminal or discharge position in which it overlies the cavity 55. As soon as the bucket has reached this position, which also takes only such a short period of time that the crumbs do not have any chance to begin coalescing in the bucket, pressure fluid is admitted into the lower ends of the gate-operating cylinders 142 and 143 carried by the bucket so as to retract the piston rods 144 and 145 and draw the clam shell gates 136 and 137 away from one another laterally of the bucket. The mass of crumbs is thus permitted to fall from the bucket into the underlying cavity 55. By virtue of the fact, however, that the opening of the gates 136 and 137 is effected at a very high speed, while the inward pitch of the bucket front and rear walls is only a slight one just sufficient to enable the bucket to clear the press framework and to provide for unobstructed movement of the gates, this mass of crumbs falls out of the bucket substantially as a unitary body and thus does not undergo any substantial reorientation of the particles or suffer any disturbance of the even distribution of the particles except for the fact that the top surface of the pile tends to flatten out and become almost truly plane and horizontal within the cavity. This condition is, therefore, seen to be attained as a direct function of the transfer of the crumbs in the described manner from the weighing scales to the press cavities by the transfer means 23. Prior to the arrival of the bucket 128 at the discharge station, of course, the four nozzles 169 and 170 are actuated to spray lubricant onto the inner wall surfaces of the forming cavity walls 51 to 54 and 57, while the two nozzles 173 are actuated to spray lubricant onto the lower faces of the plungers 37 and 38.

The admission of pressure fluid into the gate-operating cylinders 142 and 143 is now automatically reversed to close the gates 136 and 137, whereupon the closing of the microswitches 153 and 153' permits the admission of pressure fluid into the cylinder 158 to be reversed so as to retract the piston rod 160 and therewith the bucket 128 from the discharge position of the latter back to its receiving position. After the bucket 128 is retracted, the corresponding two nozzles 171 and 172 are actuated to spray lubricant into the bucket preparatory to the refilling thereof with the next charge of the polymer material, and as the bucket 128 reaches the receiving position, the trip bar 155 actuates a switch (not shown) which effects a first conditioning of the control circuit for the beginning of the next cycle.

Concurrently with the foregoing, of course, albeit slightly later during the cycle, the second batch of crumbs discharged into the chute 125 falls freely through the latter and into the transfer bucket 129, assembling therein in a loose, non-coherent mass having the same evenness of distribution and top surface characteristics as the previously described mass of crumbs in the bucket 128. As soon as the second batch is received in the bucket 129, the latter is rapidly pushed to its discharge position over the cavity 56 by admission of pressure fluid into the outer end of the cylinder 159, and thereafter the gates 136 and 137 are opened by the respective cylinders 142 and 143 to dump the second batch of crumbs into the cavity 56 in the same manner and with the same result, i.e. no substantial disturbance of the distribution of the crumbs except for the flattening out of the pile, as set forth hereinbefore with respect to the first batch of crumbs. As soon as the discharge is completed, the gates of the bucket 129 are closed and the latter is retracted toward its receiving position, the bucket being sprayed with lubricant by the second set of nozzles 171 and 172 upon arriving at its receiving position under the chute 125. When the bucket 129 is again in the position shown in FIG. 1, the trip bar 155 thereof contacts a switch which effects a further conditioning of the control circuit of the system for the next cycle.

It might be noted at this point that the transfer operation could be effected by having the weighing scale mechanisms 22 discharge simultaneously into their respective chutes 124 and 125 and by having the transfer buckets move simultaneously into and out of the press. However, in view of the tackiness of the crude polymer materials being baled and the danger that the crumbs thereof may begin to coalesce if left in any one position too long, the system is arranged so that the first scale discharges into its chute as soon as it registers the proper weight without waiting for the second scale, and so that the first bucket moves into the press and discharges into its respective cavity without delay or waiting for the other bucket. Once the first batch of crumbs is in its cavity, of course, any waiting period and possible coalescence of these crumbs is of no importance since the batch of crumbs is completely leveled by the preceding transfer operation.

As soon as the second transfer bucket has left the confines of the baling press 20, the main power ram is actuated to elevate the cavity member 50 until the latter reaches the position shown in FIG. 10 at which time further advance of the ram is inhibited. In this manner, the batches of crumbs are compressed within the cavities between the stationary upper platens or plungers 37 and 38 and the corresponding cavity bottom plates 64 and 65. The compression is continued for a period of time depending on the characteristics of the polymer material being baled, but in general with the magnitude of the compressive forces which can be applied by the press according to the present invention, this period will not exceed about 30 seconds and may actually be as short as 15 seconds.

Upon completion of the compression of the polymer material, the main ram 43 is lowered together with the cavity member 50 and the bales contained therein. These bales undergo a limited vertical expansion as the compressive force is relieved, but inasmuch as the process of the present invention ensures that the pre-compression arrangement of the crumbs in the cavities is such as to give the respective piles of crumbs substantially flat and horizontally plane top surfaces, the expansion is uniform at all sections of each bale. As a result, no irregularity of shape and dimensions can occur. It is to be noted that the bale-forming operation according to the present invention is not a true molding process in which the compressed material retains the shape and size of the mold cavity. Rather, the new bale-forming operation is most properly called a "quasi-molding process" because of the small amount of material flow that occurs during the compression stage and the relatively large amount of elastic recovery that occurs after the compression stage. It is for this reason that the even crumb distribution prior to the compression is a critical feature of the present invention.

As soon as the ram 43 begins to move toward its lowermost position, it actuates the switch 162 which in turn actuates a valve (not shown) for admitting hydraulic fluid under pressure into the lowermost ends of the push-out cylinders 78 and 79. In this manner, the cavity bottom plates 64 and 65 are raised through the respective cavities 55 and 56 concurrently with the descent thereof until, when the latter stop moving, the upper surfaces of the plates 64 and 65 are disposed just above the top plane of the cavity member 50, as shown in FIG. 11. This disposes the bales B directly opposite and in alignment with the pusher plates 94 and 95, without any idle waiting period during the downstroke of the press ram 43. When the cavity bottom plates 64 and 65 reach these positions, the corresponding two of the guide rods 76 and 77 effect actuation of the switches 166 and 168 to cause pressure fluid to be admitted into the outermost ends of the cylinders 90 and 91 so as to advance the pusher plates 94 and 95 toward the respective bales B.

As the pusher plates 94 and 95 continue to advance after engaging the bales B, the latter slide over the plates 64 and 65, across the top edge of the front cavity wall 51, and onto the horizontal plate or apron 86a attached to and extending to either side of the arm 86 carried by the cavity member 50. From the plate or apron 86a, the bales B slide onto the plate or apron 86b and thence onto the roller conveyor 25, as indicated in phantom in FIG. 11, on opposite sides of the spacer plate 87. As previously mentioned, the rollers 25 are in continuous rotation, and thus as soon as the bale ejected from the cavity 55 is fully positioned on the rollers, i.e. to the left-hand side of the spacer plate 87 as seen in FIG. 1, this bale will begin to move away from the spacer plate toward the left-hand end of the conveyor table 24 and the automatic, mechanized packaging equipment (not shown) there located. At the same time, however, the second bale ejected from the cavity 56 will remain stationary despite the movement of the rollers beneath it since its leading edge is in engagement with the plate 87. With respect to this bale, therefore, the plate 87 serves a retarding function, as more fully explained hereinafter.

When the pusher plates 94 and 95 reach their most advanced positions at the front of the press frame, two of the guide rods 96 and 97 effect actuation of the respective switches 98 and 100 which reverses the admission of pressure fluid into the cylinders 90 and 91 to retract the pusher plates 94 to their starting positions shown in FIG. 9. As the pusher plates reach these positions, the other two of the guide rods 96 and 97 effect actuation of the corresponding switches 99 and 101 which reverses the admission of hydraulic pressure fluid into the cylinders 78 and 79 and causes the cavity bottom plates 64 and 65 to be lowered to their normal positions. Upon arrival of the plates 64 and 65 at the bottoms of the respective cavities 55 and 56, the guide rods 76 and 77 effect actuation of the switches 165 and 167 which completes the conditioning of the control circuit for the next operational cycle of the system.

Thus, the scales 22 dump the respective newly weighed out charges of crumbs into the chutes 124 and 125, through which the crumbs fall freely into the transfer buckets 128 and 129, while the nozzles 169, 170 and 173 are actuated, all as hereinbefore set forth. When the cavities 55 and 56 are again filled with the said newly weighed out and evenly distributed batches of crumbs, the ram 43 again begins to rise to effect the compression of these batches into bales. As the cavity member 50 rises for this purpose, the retarder plate 87 rises with it, and as soon as it clears the second one of the initially formed bales B, the latter begins to move along the conveyor table 24 under the influence of the rotating rollers 25. It will, therefore, be seen that the first pair of bales produced in and ejected from the press 20 is fed by the conveyor rollers 25 to the location of the automatic mechanized packaging equipment (not shown) with a predetermined spacing or time lag between the bales, so as to prevent any possibility of fouling of the packaging equipment by the arrival of the second bale before the first bale has been packaged and disposed of. Upon completion of the subsequent descent of the cavity member 50, the retarder plate 87 is again disposed across the conveyor 25. In this manner, the provision of the retarder plate in accordance with the principles of the present invention assures that also for the second and all following pairs of bales ejected from the press cavities there is a definite and relatively great time lag between the delivery of the two bales of each of said pairs to the mechanized packaging equipment.

It is, of course, possible that during each bale-forming cycle a few very small crumbs or particles of the material being baled may slip through the narrow spaces between the cavity bottom plates 64 and 65 and the adjacent cavity walls 51 to 54 and 57. These lost particles, if permitted to remain and pile up on the main mounting plate 49, would soon foul the baling press to an extent necessitating a shut-down and complete overhaul thereof. It is to avoid this potential drawback that there are provided the openings 62 and 63 between the cavity walls and the mounting plate 49. Thus, between successive cycles of the baling process, or at greater intervals if desired, a blast of air may be directed into the cavities 55 and 56, either by means of a pair of nozzles (not shown) mounted on the press frame, or by means of an air hose manipulated by the one remaining press attendant, so as to blow the aforesaid lost particles out from under the plates 64 and 65 through the various openings 62 and 63 to a location where they can be collected and disposed of without damaging the press or interfering with its operation.

Although the present invention preferably makes use of clam shell buckets, such as 128 and 129, for the purpose of transferring the batches of crumbs from the chutes 124 and 125 to the cavities 55 and 56, it is possible to employ transfer buckets of somewhat modified construction. A bucket 174 of this type is shown in FIG. 6 and is seen to comprise partly vertical and partly slanted front and rear walls 175 and 176, resembling the walls 132 and 133, and tapered end walls 177 and 178, resembling the walls 134 and 135. Affixed to the outer surfaces of the inwardly tapered sections of the front and rear walls 175 and 176 are downwardly extending brackets 179 and 180 in the lowermost ends of which are provided a pair of inwardly facing channels 181 and 182. Slidably received in the channels 181 and 182 is a gate member 183 one end edge of which is connected with a piston rod 184 projecting from a double-acting cylinder 185 of a quick-acting pneumatic motor, the cylinder being fixedly supported by the bucket 174 at the end plate 177 thereof through the intermediary of a bracket or arm 186. Also connected to the end wall 177 of the bucket 174 adjacent the upper edge thereof is the piston rod 161 (or 160) of the double-acting cylinder 159 (or 158) mounted on the stationary support 157 (or 156). Rollers or wheels 187 are provided at the upper, vertical sections of the front and rear bucket walls 175 and 176. In operation, when this bucket reaches its discharge position over the respective one of the cavities 55 and 56, pressure fluid is admitted into the cylinder 185 so as to retract the piston rod 184 and therewith the slide gate 183, which permits the batch of crumbs in the bucket to fall rapidly and effectively as a unitary mass through the open bottom of the bucket into the aforesaid cavity without any substantial reorientation of the crumbs other than the flattening out of the top surface of the entire batch.

The present invention has been described herein as embodied in a system employing a press including a dual cavity structure 50 and a dual plunger arrangement 37 and 38, which necessitates the provision of a pair of transfer buckets. It will be readily understood, however, that the cavity member 50 may be provided with only one cavity which would require only one plunger and one transfer bucket, or that it may be provided with more than two cavities which would require the provision of a correspondingly larger number of plungers and transfer buckets. Moreover, the terms "particles" and "particulate" as and whenever employed herein are not to be interperted as limited to crumbs or like relatively large chunks or pieces, it being understood that the process according to the present invention may be applied to the baling, without curing, of particles of widely varying sizes, including grains, pellets, small blocks or other regularly shaped bodies, capsules, etc., of crude and tacky polymer materials which are possessed of the property of post-compression recovery and thus do not lend themselves to ordinary baling procedures.

It will further be understood that a number of other changes may also be made in the structures and procedural steps described herein and illustrated in the drawings without any departure from the spirit of the invention and from the scope thereof as defined by the appended claims.

Having thus described my invention, what I claim and desire to secure by Letters Patent is:

1. The process of baling, without curing, tacky polymer material having the property of post-compression recovery, comprising weighing out at least one batch of crumbs of said material at high speed to prevent coalescence thereof; permitting said batch of crumbs to fall freely through a chute into a transfer bucket having substantially the same shape as the bale to be formed, the distance of free fall being such as to permit individual crumbs to rebound and collide with subsequent crumbs, thereby to form an agitated mass which settles without any loss of crumbs into said bucket with a substantially plane top surface; rapidly transporting said mass in said bucket to a discharge station; dropping said mass as a unit and without any loss of or substantial reorientation of its particles into a cavity having substantially the same shape as said bucket; and compressing said mass in said cavity into a block-shaped bale.

2. The process of baling, without curing, tacky polymer material having the property of post-compression recovery, comprising weighing out at least one batch of crumbs of said material at high speed to prevent coalescence thereof; permitting said batch of crumbs to fall freely through a chute into a transfer bucket having substantially the same shape as the bale to be formed, the distance of free fall being such as to permit individual crumbs to rebound and collide with subsequent crumbs, thereby to form an agitated mass of crumbs which settles into said bucket with a slightly convex upper surface but without any loss of crumbs; rapidly transporting said mass while in a non-coherent state in said bucket to a discharge station; dropping said mass as a unit and without any loss of or substantial reorientation of its particles, except for rendering its upper surface substantially plane and horizontal, into a cavity having substantially the same shape as said bucket; and subjecting said mass in said cavity to a compressive force to form said crumbs into a unitary block-shaped body, which upon expansion subsequent to release of said force has precisely predetermined dimensions and plane faces without substantial irregularities therein.

References Cited in the file of this patent

UNITED STATES PATENTS

| | | |
|---|---|---|
| 1,426,761 | Norton | Aug. 22, 1922 |
| 2,256,081 | Farley | Sept. 16, 1941 |
| 2,352,771 | Cowan et al. | July 4, 1944 |
| 2,486,346 | Wachs | Oct. 25, 1949 |
| 2,514,486 | Green | July 11, 1950 |
| 2,675,584 | Fienberg | Apr. 20, 1954 |
| 2,858,594 | Enich et al. | Mar. 4, 1958 |